A. H. HENDERSON.
CUSHIONED TIRE FOR VEHICLES.
APPLICATION FILED OCT. 13, 1910.
1,095,861.
Patented May 5, 1914.
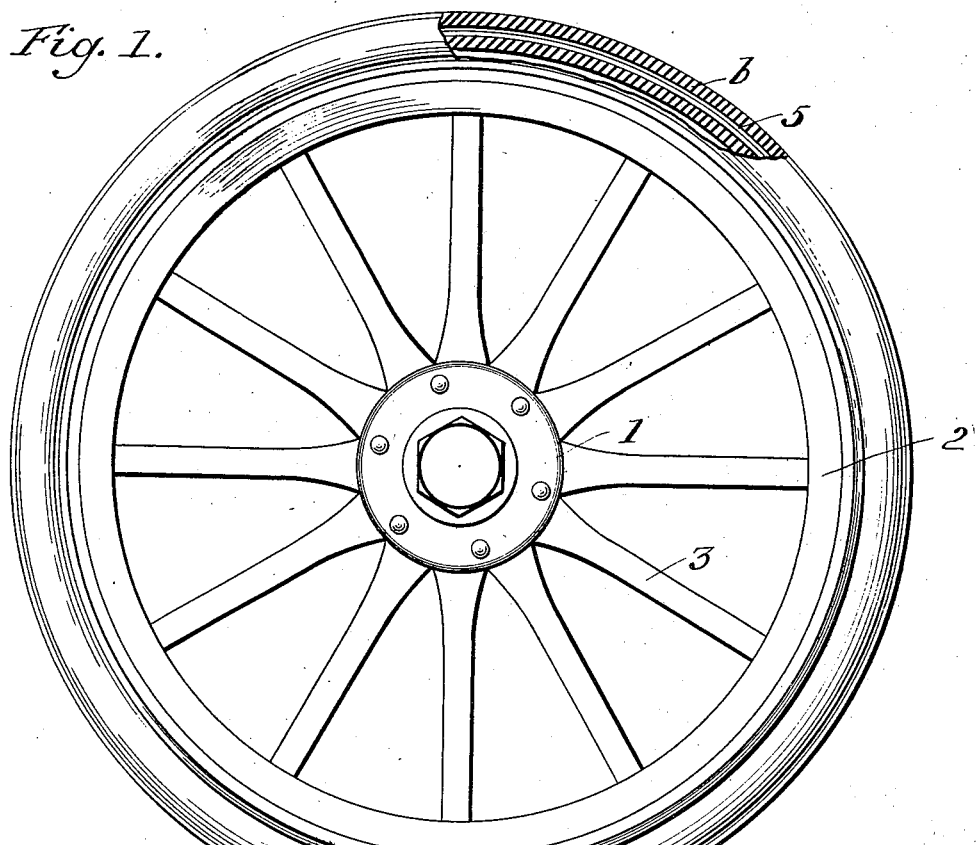
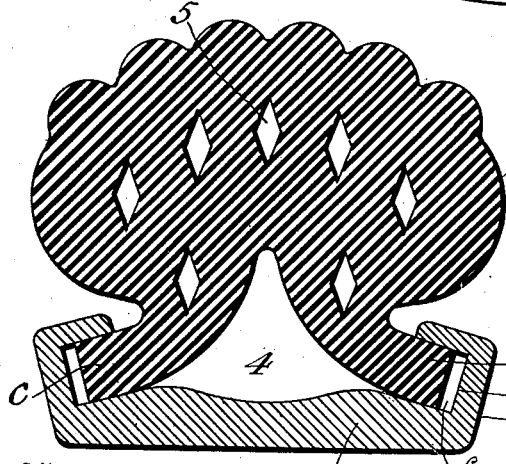
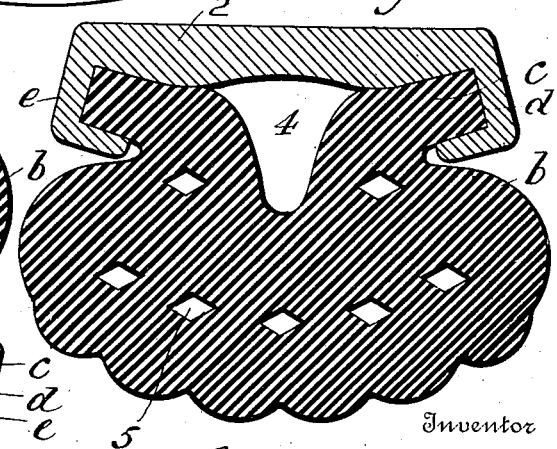
Witnesses
Frank B. Wooden.
H. Findlay French.
Inventor
Albert H. Henderson,
By G. H. W. J. Howard,
W. J. Howard.
Attorney

UNITED STATES PATENT OFFICE.

ALBERT H. HENDERSON, OF BALTIMORE, MARYLAND, ASSIGNOR TO THE HENDERSON RUBBER COMPANY, OF BALTIMORE, MARYLAND, A CORPORATION OF MARYLAND.

CUSHIONED TIRE FOR VEHICLES.

1,095,861. Specification of Letters Patent. Patented May 5, 1914.

Application filed October 13, 1910. Serial No. 586,833.

*To all whom it may concern:*

Be it known that I, ALBERT H. HENDERSON, of the city of Baltimore and State of Maryland, have invented certain Improvements in Cushioned Tires for Vehicles, of which the following is a specification.

This invention relates to a peculiar construction of the tire, and the relation which the same bears to the rim of the wheel, whereby the resiliency or elasticity of the tire, apart from that which is inherent in the material, is increased, as will hereinafter fully appear.

In the further description of the said invention which follows reference is made to the accompanying drawing, forming a part hereof, and in which,—

Figure 1 is a partly sectional side view of a wheel provided with a cushioned tire constructed after the manner of my invention. Fig. 2 is an enlarged cross section of a part of the tire which is not under any compression strain. Fig. 3 is a view similar to Fig. 2 except that the tire is shown as it appears when compressed by the weight of the vehicle.

Referring now to the drawing, 1 represents the hub, 2 the rim, and 3 the spokes of the wheel.

The tire is formed of a material of which rubber is the principal ingredient, in order that it may have a certain elasticity without respect to its conformation, or its shape in cross section.

By reference to Fig. 2 which shows the tire as it appears when not compressed, it will be seen that it consists of an annular body *b* having practically an elliptical transverse section, provided at its inner circumference with two diverging or outwardly flared annular projections *c* the edges of which enter pockets *d* formed in the rim 2 by the flanges *e*. It will also be seen that the cavity 4 which exists between the annular projections *c* is V shaped, and extends outward or from the center of the wheel and beyond the junction of the said projections with the body, and well into the latter thus admitting of the compression of the device into substantially the form illustrated in Fig. 3. It will also be seen by reference to the drawing, that there are formed throughout the body *b* of the tire, several endless annular channels 5 which are lozenge shaped in cross section, and with their longer dimension in a direction which is at a right angle with respect to the axis of the wheel. Under severe compression strain, the shape of these channels is reversed as shown in Fig. 3, that is to say, their longer dimension becoming parallel with the axis of the wheel.

It is believed that the lozenge shape of channel described gives a more satisfactory result than any other, in that the resistance to change in the form increases rapidly as compression force is applied to the tire when in use.

To increase the flexibility of the tire and at the same time prevent extreme flattening of the body of the same the normal width across the projections *c* is made less than the distance between the ends of the pockets, thus leaving the vacant spaces *f* shown in Fig. 2.

It will be further understood that the cavity 4 being V shaped in cross section its form will be modified in the compression of the tire in the same manner as are the channels 5, but not to the same extent. The shape of the cavity when the tire is fully compressed is indicated in Fig. 3.

It is a difficult matter to illustrate exactly the changes in shape of the channels 5, and the cavity 4, constantly taking place in the use of the tire, under any or all circumstances, but I have described and shown what I believe to be substantially the alteration in form of the tire as it comes into contact with the road bed and is flattened by the weight of the vehicle.

I claim as my invention,—

A resilient tire having a central annular inverted V-shaped cavity, said tire further having annular downwardly and outwardly flared sections the inner walls of which form the sides of said cavity, combined with a rim the outer circumference of which is shaped transversely with an undulating tire supporting surface and which rim has also annular inwardly opening side members which latter with the undulating surface of said outer rim area constitute pockets to receive the said downwardly and outwardly flared sections of the tire, there being continuous spaces between the outer edges of said flared sections of the tire and the walls of the inwardly opening side members of the rim pockets, whereby sliding movement of said flared sections in said rim pockets and a movement of said sections over or upon the undulating surface of said rim area are permitted, substantially as set forth.

ALBERT H. HENDERSON.

Witnesses:
JULIA B. ROBINSON,
WM. T. HOWARD.